United States Patent
Matsui et al.

(10) Patent No.: US 7,310,398 B2
(45) Date of Patent: Dec. 18, 2007

(54) SYMBOL SYNCHRONIZING DEVICE

(75) Inventors: Masaki Matsui, Tokyo (JP); Yukitoshi Sanada, Tokyo (JP)

(73) Assignee: Uniden Corporation, Tokyo (JP)

(*) Notice: Subject to any disclaimer, the term of this patent is extended or adjusted under 35 U.S.C. 154(b) by 624 days.

(21) Appl. No.: 10/991,069

(22) Filed: Nov. 17, 2004

(65) Prior Publication Data

US 2005/0249270 A1    Nov. 10, 2005

(30) Foreign Application Priority Data

May 7, 2004 (JP) ............................. 2004-138503

(51) Int. Cl.
*H04L 7/00* (2006.01)
(52) U.S. Cl. ...................... 375/365; 375/354
(58) Field of Classification Search .............. 375/365, 375/354, 355, 364; 455/293, 337
See application file for complete search history.

(56) References Cited

U.S. PATENT DOCUMENTS 5,610,946 A * 3/1997 Tanaka et al. ............... 375/269
2005/0125176 A1 * 6/2005 Makhlouf et al. ............ 702/69

FOREIGN PATENT DOCUMENTS

JP    2002-141112    11/2003

\* cited by examiner

*Primary Examiner*—Khai Tran
(74) *Attorney, Agent, or Firm*—Steven J. Hultquist; Intellectual Property/Technology Law

(57) ABSTRACT

A symbol synchronization device that enables effective symbol synchronization establishment and synchronization holding for an arbitrary spread code sequence. The device includes (i) a primary demodulation section for receiving a spread modulation signal where chips for symbol synchronization are added to a symbol data after spread modulation, and demodulating the spread modulation signal to a base band spread modulation signal, (ii) symbol synchronization chip removal means for removing chips for symbol synchronization from the base band spread modulation signal, (iii) a secondary demodulation section for despreading the base band spread modulation signal from which the chips for symbol synchronization are removed, (iv) a symbol timing regeneration section for regenerating a symbol timing by performing in-phase addition of the base band spread modulation signals; and (v) a symbol decision section for deciding the symbols for the despread signals that are output from the secondary demodulation section, synchronizing with the symbol timing.

4 Claims, 2 Drawing Sheets

SYMBOL SYNCHRONIZING DEVICE

BACKGROUND

The present invention relates to a symbol synchronizing device, and more particularly to an improvement technology which effectively enables symbol synchronization establishment and synchronization holding for an arbitrary spread code sequence.

As an approach for establishing symbol synchronization between a transmitter and a receiver in a digital radio communication using a spread spectrum communication system, a method for enhancing a symbol sequence for synchronization by performing an in-phase addition of receive signals and detecting correlation after improving the signal to noise ratio (SNR) of the receive signals is disclosed in Japanese Patent Application Laid-Open No. 2003-333011. According to this method, symbols for synchronization can be easily detected even if correlation detection is difficult due to inter-symbol interference and noise.

With this method, however, phase information is detected by correlation detection, so the auto-correlation characteristics of the spread code sequence of symbols for synchronization influence the symbol synchronization characteristics. Therefore, if the synchronization method based on correlation detection is used for a system which uses a plurality of spread codes for a data symbol sequence, then symbol synchronization establishment and synchronization holding when a data symbol sequence is being received becomes difficult.

SUMMARY

The present invention resolves the above-described problem and provides a symbol synchronization device that effectively enables symbol synchronization establishment and synchronization holding for an arbitrary spread code sequence.

The present invention relates in one aspect to a symbol synchronization device, including: a primary demodulation section for receiving a spread modulation signal where chips for symbol synchronization are attached to symbol data after spread modulation, and demodulating the spread modulation signal to a base band spread modulation signal; symbol synchronization chip removal means for removing the chips for symbol synchronization from the base band spread modulation signal; a secondary demodulation section for despreading the base band spread modulation signal from which the chips for symbol synchronization are removed by the symbol synchronization chip removal means; a symbol timing regeneration section for regenerating a symbol timing by performing an in-phase addition of the base band spread modulation signal demodulated by the primary demodulation section; and a symbol decision section for deciding the symbols for the despread signal which is output from the second demodulation section, synchronizing with the symbol timing regenerated by the symbol timing regeneration section. By attaching chips for symbol synchronization to the symbol data after spread modulation at the transmitter side, and detecting these at the receiver side by an in-phase addition, effective symbol synchronization establishment and synchronization holding for arbitrary spread codes become possible.

In a system using a plurality of spread codes, such as a M-ary/DS system, a signal, where a plurality of spread modulation signals, after the spread modulation signal is spread to be an integral multiple of a predetermined spreading factor, are multiplexed, is used, so symbol synchronization establishment and synchronization holding can be implemented simultaneously for a multiplexed respective spread modulation signal.

It is preferable that the symbol timing regeneration section performs an in-phase addition of the base band spread modulation signals for each period of the chip for symbol synchronization. By performing an in-phase addition for each period of the chip for synchronization, a more accurate symbol synchronization establishment and synchronization holding becomes possible.

Other aspects, features and advantages of the present invention will be more fully apparent from the ensuing disclosure and appended claims.

DETAILED DESCRIPTION

Figure 2:
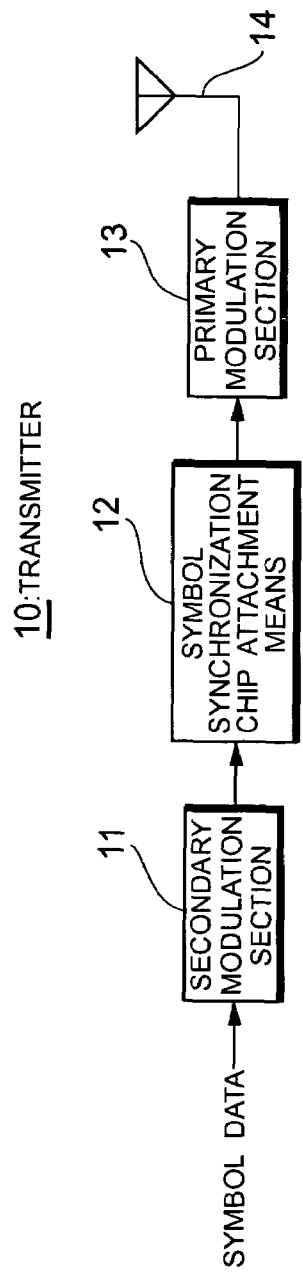
FIG. 2 is a block diagram of the transmitter of such embodiment.

FIG. 2 shows the configuration of a transmitter for performing M-ary/DS type spread spectrum communication. The transmitter 10 is comprised of a secondary modulation section 11, symbol synchronization chip attachment means 12, primary modulation section 13 and antenna 14. The secondary modulation section 11 performs the spread modulation of symbol data using spread codes where K bits of the symbol data is one symbol and one symbol length is one period. There are 2K number of spread code sequence. The symbol synchronization chip attachment means 12 attaches a chip for symbol synchronization to a spread modulation signal for which the secondary modulation section 11 performed spread modulation. It is desirable that the chip for symbol synchronization is inserted in each symbol, but this location is not especially limited only if the location is where symbol synchronization establishment and synchronization holding are possible, so insertion may be at every two symbols or at every three symbols, or at random. The primary modulation section 13 performs primary modulation on the spread modulation signals to which chips for synchronization are added, and sends this to the antenna 14 as a radio signal.

Figure 1:
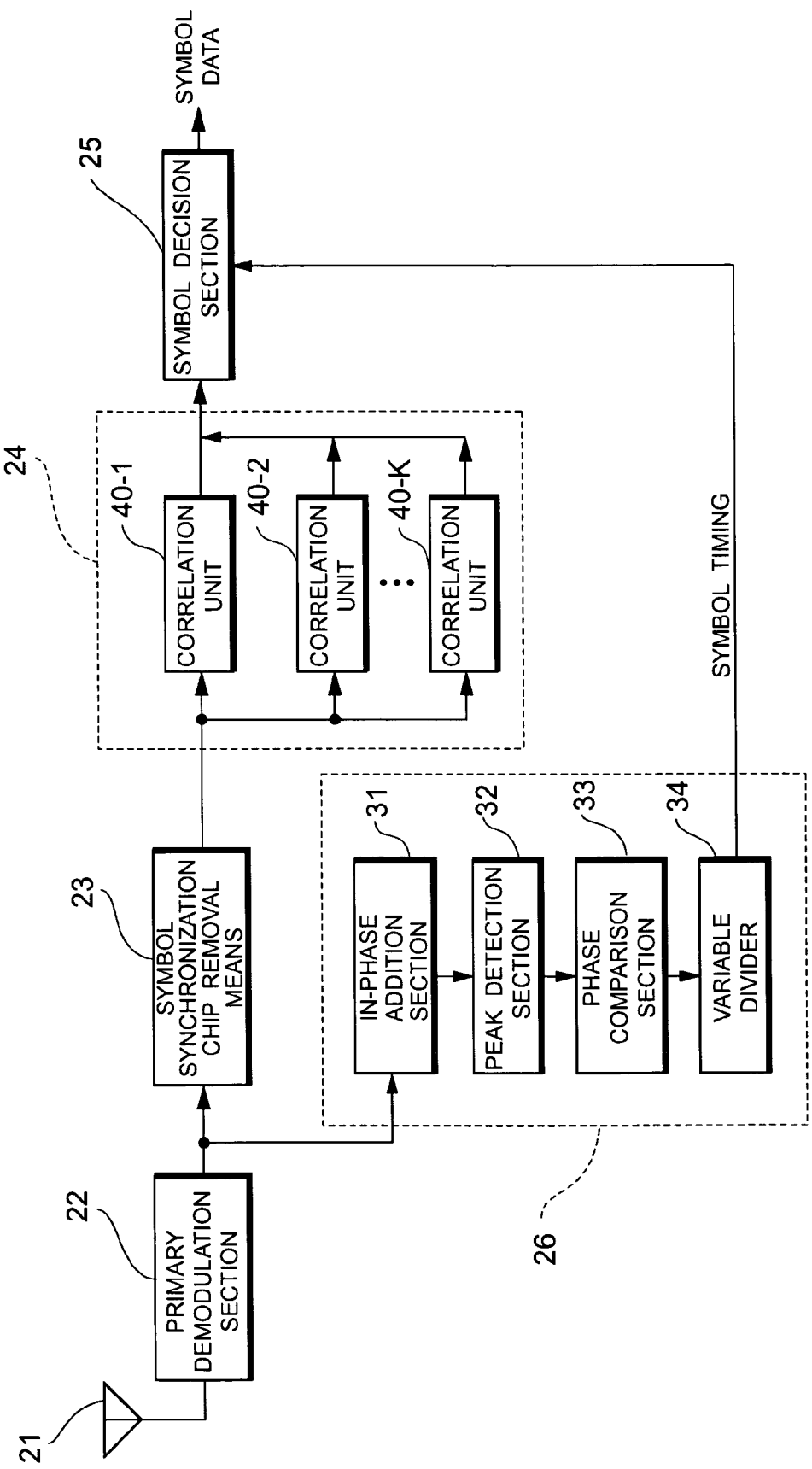
FIG. 1 is a block diagram of the receiver according to one embodiment of the present invention.

FIG. 1 shows the configuration of a receiver for performing M-ary/DS type spread spectrum communication. The receiver (symbol synchronization device) 20 includes an antenna 21, primary demodulation section 22, synchronization chip removal means 23, secondary demodulation section 24, symbol decision section 25 and symbol timing regeneration section 26. The primary demodulation section 22 demodulates the spread modulation signal received via the antenna 21 to the base band spread modulation signal. In this base band spread modulation signal, the chips for symbol synchronization have been attached by the above mentioned symbol synchronization chip attachment means 12. The symbol synchronization chip removal means 23 removes the chip for synchronization from the base band spread modulation signal. The secondary demodulation section 24 performs despreading on the base band spread modulation signal where chips for symbol synchronization were removed. The secondary demodulation section 24 is comprised of K number of correlation units 40-1, 40-2, ..., 40-K, detects correlation for a plurality of types of spread codes, judges the spread codes used by the transmitter 10, and performs despreading. For the despread signal which has been thus despread, a symbol is judged by the symbol decision section 25.

The symbol timing regeneration section 26 is comprised of an in-phase addition section 31, peak detection section 32, phase comparison section 33 and variable divider 34. The in-phase addition section 31 performs N times of in-phase addition for (M+1) chips in the base band spread modulation signal demodulated by the primary demodulation section 22. Here M is a code length of the spread code. In the in-phase addition section 31, it is unnecessary to perform in-phase addition all the time, but, for example, the in-phase addition may be performed before and after the chip block where the chip for symbol synchronization is inserted (at every period of a chip for synchronization). If in-phase addition is performed for the base band spread modulation signal, the ratio of "1" and "−1" in each chip block of the base band spread modulation signal is almost equal, so the result of N times of in-phase addition is almost zero, but if "1" is attached as a chip for symbol synchronization, a peak can be detected by the N times of in-phase addition in the chip block where the chip for symbol synchronization is attached. This peak specifies the position where a chip for symbol synchronization was inserted, that is symbol timing. The peak detection section 32 judges whether the peak acquired by this in-phase addition exceeded a predetermined threshold. If the peak exceeds a predetermined threshold, the phase comparison section 33 compares this with a desired phase, and based on the phase comparison, the variable divider 34 inserts/extracts high-speed pulses, and regenerates the symbol timing. The symbol decision section 25 decides the symbols for the despread signal which is output from the secondary demodulation section 24, with synchronizing the symbol timing, which is regenerated by the symbol timing regeneration section 26.

Figure 3:
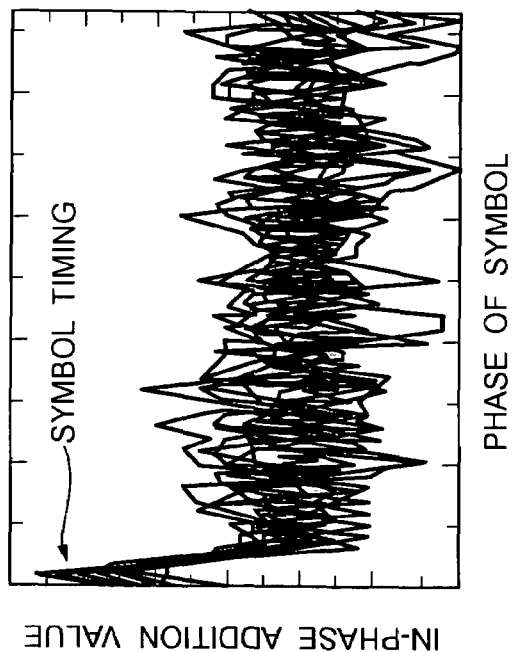
FIG. 3 shows a computer simulation result of the symbol timing.

FIG. 3 shows the result of in-phase addition with BER (Bit Error Rate)=3e-2 under an AWGN environment based on computer simulation. Here in-phase addition for 40 symbols was performed 20 times, and the respective results were overlaid and indicated. As FIG. 3 shows, symbol timing can be detected in a weak electric field, which means that symbol synchronization establishment and synchronization holding by this system are sufficiently feasible.

According to this system, effective symbol synchronization establishment and synchronization holding can be performed for an arbitrary spread code sequence (spreading factor). After symbol synchronization is established, synchronization can be held only by performing in-phase addition of several chips before and after the chip for symbol synchronization, so the computing amount can be decreased more than the method based on correlation detection. This can be particularly effective for a high bit rate system. Therefore this system becomes an effective technology for software radio as well. Also, in a system using a plurality of spread codes, such as the M-ary/DS system, symbol synchronization establishment and synchronization holding become possible for a data symbol sequence, so the space between chips for symbol synchronization to be inserted can be increased, and the effective rate can be increased. In the above mentioned prior art, in-phase addition is performed for the pilot symbol sequence, but according to this system, the chips for symbol synchronization are attached to the spread-modulated symbol data, so in-phase addition can be performed not only for symbols for synchronization but also for data symbols, where the symbols to be the target of in-phase addition need not be limited. Therefore symbol synchronization establishment and synchronization holding become possible even when data symbols are being received.

In the configuration of the above embodiment, the chips for symbol synchronization are attached to the symbol data, but the present invention is not limited to this, and the transmitter side may perform frame synchronization by attaching symbols for frame synchronization to the symbol data before spread modulation, for example. In other words, the synchronization control target may be changed depending on the position to insert the code (chip or symbol) for synchronization. Also symbol synchronization establishment and synchronization holding may be performed simultaneously for signals, where a plurality of spread modulation signals, spread to be an integral multiple of a predetermined spreading factor, are multiplexed, by setting the interval between chips for synchronization to be inserted not at each symbol but at an integral multiple thereof. In the case of a M-ary/DS system, which uses a plurality of spread codes, spread codes which have good auto-correlation must be selected, but according to the present invention, symbol synchronization establishment and synchronization holding become possible without using spread signals with good auto-correlation.

While the invention has been described herein with reference to illustrative features and embodiments, other variations, modifications and alternative embodiments of the invention will readily suggest themselves to those of ordinary skill in the art based on the disclosure herein, and therefore are to be regarded as being within the spirit and scope of the invention.

We claim:

1. A symbol synchronization device, comprising:
    a primary demodulation section for receiving a spread modulation signal where chips for symbol synchronization are attached to a symbol data after spread modulation and demodulating the spread modulation signal to a base band spread modulation signal;
    symbol synchronization chip removal means for removing said chips for symbol synchronization from said base band spread modulation signal;
    a secondary demodulation section for despreading the base band spread modulation signal from which the chips for symbol synchronization are removed by said symbol synchronization chip removal means;
    a symbol timing regeneration section for regenerating a symbol timing by performing in-phase addition of the base band spread modulation signals demodulated by said primary demodulation section; and
    a symbol decision section for deciding the symbols for the despread signals that are output from said secondary demodulation section, synchronizing with the symbol timing regenerated by said symbol timing regeneration section.

2. The symbol synchronization device according to claim 1, wherein said spread modulation signal is a signal where a plurality of signals are spread to be an integral multiple with a predetermined spreading factor.

3. The symbol synchronization device according to claim 1, wherein said symbol timing regeneration section performs in-phase addition of said base band spread modulation signals for each cycle of the chip for symbol synchronization.

4. The symbol synchronization device according to claim 2, wherein said symbol timing regeneration section performs in-phase addition of said base band spread modulation signals for each cycle of the chip for symbol synchronization.

* * * * *